(12) United States Patent  
Visker et al.

(10) Patent No.: US 7,641,220 B2
(45) Date of Patent: Jan. 5, 2010

(54) AIRBAG FOLD BRACKET

(75) Inventors: Jeremy Visker, West Haven, UT (US); Hiroshi Noma, Kasumigaura (JP)

(73) Assignee: Autoliv ASP, Inc., Ogden, UT (US)

( * ) Notice: Subject to any disclaimer, the term of this patent is extended or adjusted under 35 U.S.C. 154(b) by 203 days.

(21) Appl. No.: 11/714,037

(22) Filed: Mar. 5, 2007

(65) Prior Publication Data

US 2008/0217896 A1 Sep. 11, 2008

(51) Int. Cl.
*B60R 21/16* (2006.01)
(52) U.S. Cl. ............ 280/728.2; 280/728.1; 280/730.2; 280/743.1; 24/295; 24/555; 24/563
(58) Field of Classification Search ............ 280/728.1, 280/728.2, 728.3, 730.2, 743.1; 24/295, 24/458, 545, 555, 563
See application file for complete search history.

(56) References Cited

U.S. PATENT DOCUMENTS

| | | | |
|---|---|---|---|
| 5,746,690 A * | 5/1998 | Humbarger et al. ......... 493/405 |
| 6,209,907 B1 * | 4/2001 | Fischer ..................... 280/728.3 |
| 6,305,707 B1 | 10/2001 | Ishiyama et al. ......... 280/728.2 |
| 6,743,162 B2 * | 6/2004 | Hieber et al. .............. 493/457 |
| 6,758,490 B2 | 7/2004 | Hoeft et al. ............. 280/730.2 |
| 6,851,702 B2 | 2/2005 | Henderson et al. |
| 7,097,200 B2 | 8/2006 | Wold |
| 7,163,231 B2 | 1/2007 | Kumagai |
| 7,261,682 B2 * | 8/2007 | Crookston et al. ........... 493/457 |
| 7,357,408 B2 * | 4/2008 | Hall et al. ................. 280/728.2 |
| 2003/0042712 A1 * | 3/2003 | Henderson et al. ....... 280/728.2 |
| 2005/0046154 A1 * | 3/2005 | Rhea et al. .............. 280/728.2 |
| 2005/0110256 A1 | 5/2005 | Crookston et al. |
| 2006/0138762 A1 * | 6/2006 | Jang ........................ 280/743.1 |
| 2007/0090634 A1 * | 4/2007 | Jang et al. ................ 280/730.2 |
| 2008/0197610 A1 * | 8/2008 | Downey ................... 280/730.2 |

OTHER PUBLICATIONS

Notification of Transmittal of the International Search Report and the Written Opinion of the International Searching Authority issued Sep. 29, 2008 in International Application No. PCT/US2008/055420.

* cited by examiner

*Primary Examiner*—Ruth Ilan
*Assistant Examiner*—James English
(74) *Attorney, Agent, or Firm*—Sally J Brown; Stoel Rives LLP

(57) ABSTRACT

An airbag system in a motor vehicle including one or more inflatable airbags and at least one airbag fold bracket configured to indicate the location of at least one airbag fold of the inflatable airbag. The airbag fold bracket may also be configured to maintain the position and shape of the airbag fold of the inflatable airbag while in the undeployed state. Furthermore, the airbag fold bracket may be configured to adjust and tune the deployment of the inflatable airbag.

9 Claims, 5 Drawing Sheets

AIRBAG FOLD BRACKET

TECHNICAL FIELD

The present disclosure relates generally to the field of motor vehicle occupant protective systems. More specifically, the present disclosure relates to packaging and deployment of passenger airbag systems.

BRIEF DESCRIPTION OF THE DRAWINGS

Understanding that drawings depict only typical embodiments of the invention and are not therefore to be considered to be limiting of its scope, the invention will be described and explained with specificity and detail through the use of the accompanying drawings as listed below.

INDEX OF ELEMENTS IDENTIFIED IN THE DRAWINGS

Figure 1:
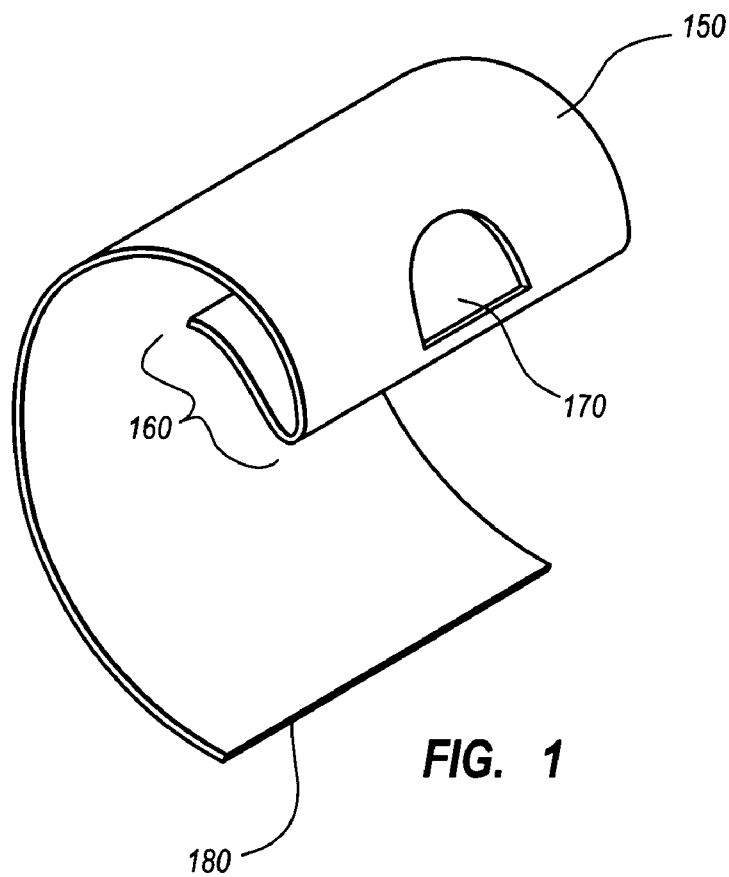
FIG. 1 is a perspective view of an airbag fold bracket.

100 airbag cushion
110 fold location
120 first end of the airbag cushion
150 airbag fold bracket
155 break-away tape
160 fold retainer clip
170 fold window
180 alignment end
200 airbag cushion
205 rolled portion
210 fold location
250 airbag fold bracket
260 fold retainer clip
270 fold window
280 attachment tab
282 attachment hole
300 airbag cushion
310 fold location
350 airbag fold bracket
355 positioning tab
370 fold retainer tab
375 break-away tape

DETAILED DESCRIPTION OF EXEMPLARY EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in the drawings, the drawings are not necessarily drawn to scale unless specifically indicated.

As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Figure 2:
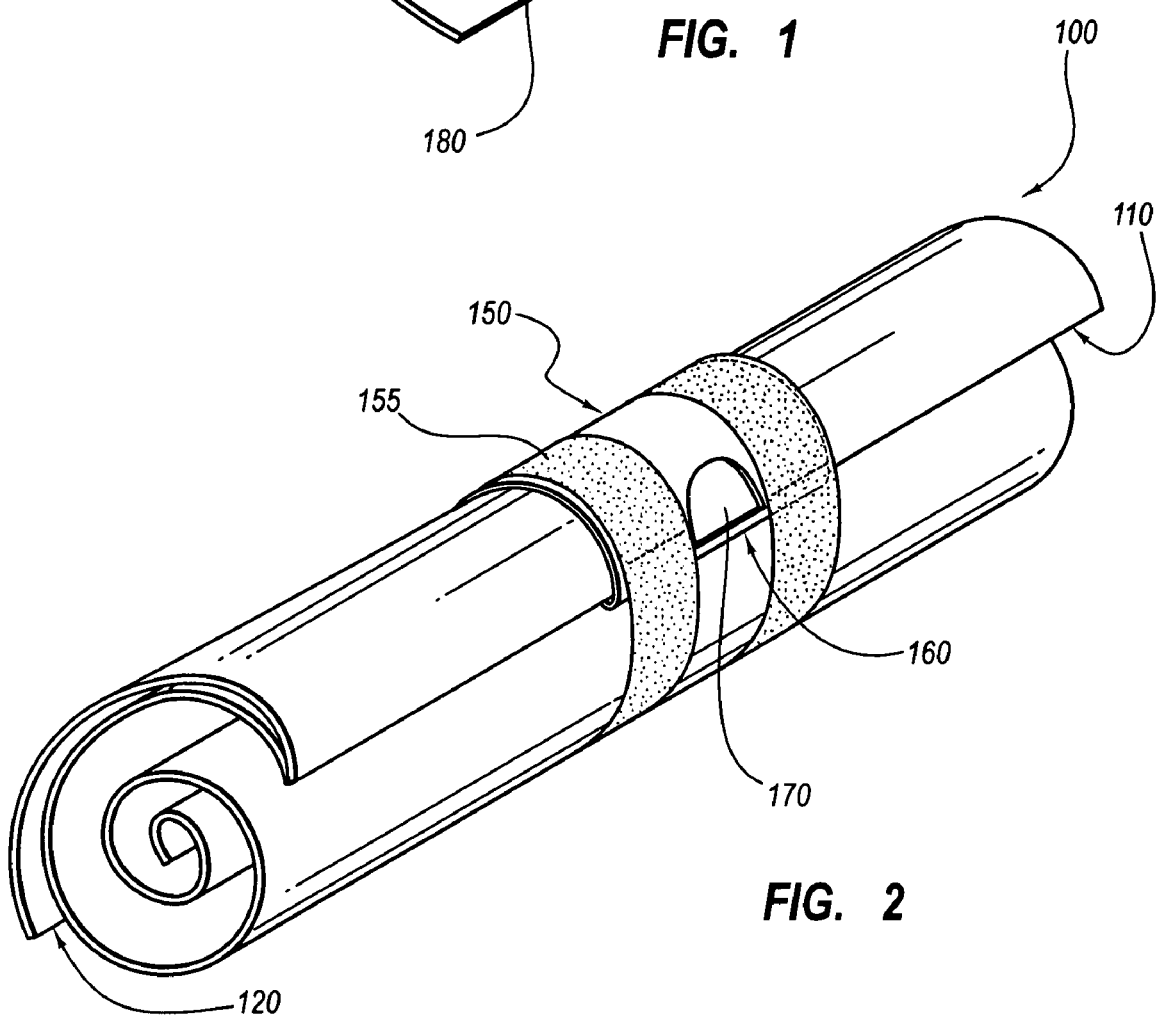
FIG. 2 is a perspective view of a folded inflatable airbag cushion with the airbag fold bracket from FIG. 1 in place.

Referring to FIG. 1 and FIG. 2, an airbag system for protecting a passenger in a motor vehicle may include one or more inflatable airbags such as airbag cushion 100. The airbag cushion 100, in its undeployed state, may be packaged and stored, i.e. folded and/or rolled, in a motor vehicle in a desired position. For example, the airbag cushion 100 may be disposed along the roof rail of a vehicle. As known by those of skill in the art, the manner in which the airbag cushion 100 is folded and/or rolled may affect the speed and direction of the deployment of the airbag cushion 100. For purposes of example only and not meant as a limitation, the airbag cushion 100 may be folded and rolled as shown in FIG. 2. Furthermore, airbag cushion 100 may be folded and rolled as shown in U.S. Pat. No. 6,758,490, incorporated by reference herein in its entirety, which discloses a folding configuration for an inflatable airbag to facilitate more accurate and efficient airbag deployment.

Because the manner in which an airbag is folded and stored affects deployment, it may be desirous to ensure that the undeployed airbag cushion 100 is folded and stored consistently from vehicle to vehicle. Furthermore, it may be desirous that the configuration of the airbag cushion 100 after being folded and/or rolled be maintained for the life of the vehicle.

With continued reference to FIG. 1 and FIG. 2, at least one airbag fold bracket 150 may be used to ensure the correct fold location 110 for the airbag cushion 100. The airbag fold bracket 150 may include a fold retainer clip 160 and a fold window 170. The fold retainer clip 160 may be configured to locate and align the fold location 110. For example, the fold retainer clip 160 may be configured with a first end or an alignment end 180 that can be used as a fixed or rigid measure for alignment of the fold location 110 relative to a first end 120 of the inflatable airbag cushion 100. The alignment end 180 may also be disposed or attached proximate to a desired location of the airbag cushion 100 and the fold retainer clip 160 may be used to measure the location of the fold location 110 relative to the alignment end 180. The fold location 110 may be maintained by the fold retainer clip 160 and the fold window 170 may be used to verify the correct position and alignment of the fold location 110. The airbag fold bracket 150 may be attached to the airbag cushion 100 at any desired position and in a number of ways such as with rivets, bolts, screws, adhesives, tapes, and other attachment means. For example, as shown by FIG. 2, the airbag fold bracket 150 may be held in place with the use of a break-away tape 155 that may be wrapped around the airbag cushion 100 in an undeployed state. During deployment, the break-away tape 155 may be severed by the force of the inflation of the airbag cushion 100.

In another embodiment, an airbag system may include one or more of an airbag fold bracket such as the airbag fold bracket 150. For example, the airbag system may include a side curtain airbag that extends along a driver's or a passenger's side of a vehicle. In one embodiment, the side curtain airbag may be attached to the roof rail of a vehicle and may be concealed by a headliner in the undeployed state. The side curtain airbag may be configured to protect a front or rear passenger from impact against the side of the vehicle. The airbag system may also include one long curtain airbag configured to protect both front and rear passengers. It may be desirous to use one or more airbag fold brackets to align and maintain the shape of the of the packaged airbag. Particularly, it may be desirous to use multiple airbag fold brackets when the airbag 100 extends as one long curtain airbag for protecting both front and rear passengers.

Figure 3:
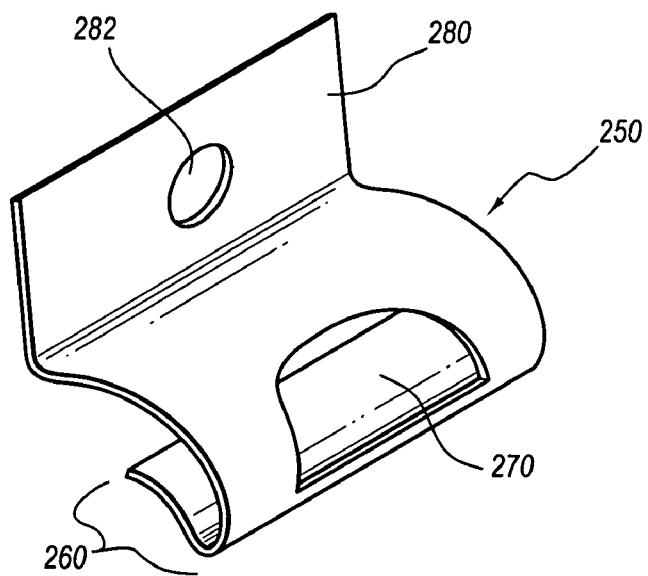
FIG. 3 is a perspective view of an airbag fold bracket.
Figure 4:
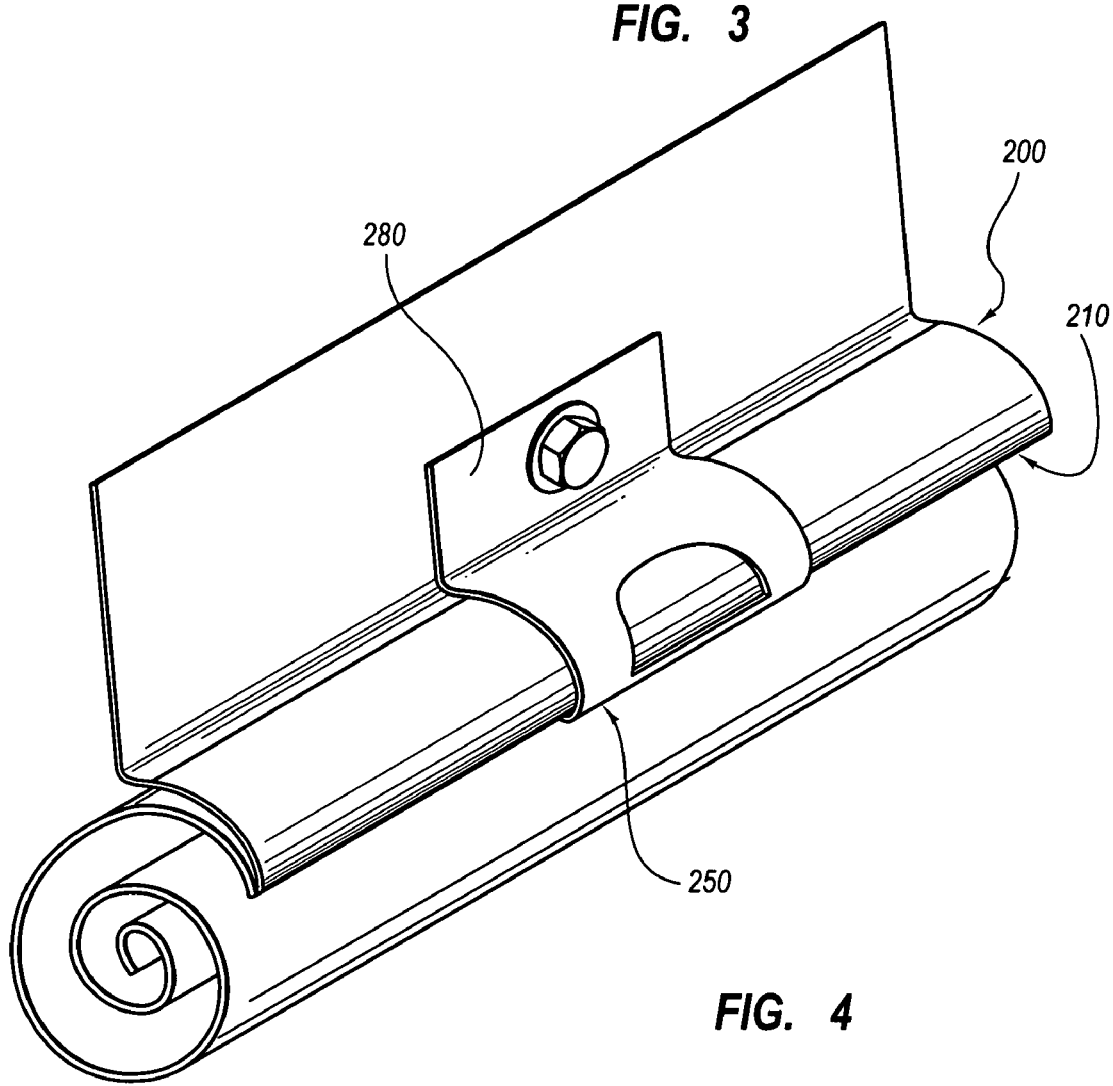
FIG. 4 is a perspective view of a folded inflatable airbag cushion with the airbag fold bracket from FIG. 2A.

Referring now to FIG. 3 and FIG. 4, the airbag system may include at least one airbag fold bracket 250 and one or more airbag cushions such as airbag cushion 200. The airbag fold bracket 250 may include a fold retainer clip 260 and a fold window 270. Furthermore, the airbag fold bracket 250 may include an attachment tab 280 configured to align and attach the airbag fold bracket 250 with the airbag cushion 200. The attachment tab 280 may also facilitate the attachment of the airbag cushion 200 to a motor vehicle.

Similar to the airbag fold bracket 150 shown in FIGS. 1 and 2, at least one airbag fold bracket 250 may be used to ensure the correct fold location 210 of the airbag cushion 200. The airbag fold bracket 250 may also be configured to maintain the position and alignment of the airbag cushion 100 while stored in the undeployed state. The airbag fold bracket 250 may include a fold retainer clip 260 and a fold window 270. The fold retainer clip 260 may be configured to locate and align the fold location 210. For example, the fold retainer clip 260 may be configured with an attachment tab 280 that can be used as a fixed point for alignment of the fold location 210 relative to a designated area of the inflatable airbag cushion 200. The attachment tab 280 may be secured to the airbag cushion 200 by sewing, riveting, clamping, taping and other desired means. The attachment tab 280 may also include an attachment hole 282 through which the airbag fold bracket 250 may be positioned and attached to the airbag cushion 200. The attachment tab 280 may also be configured to secure the airbag fold bracket 250 to a motor vehicle. The fold location 210 and the configuration of the undeployed airbag cushion 200 may be maintained by the fold retainer clip 260 and the fold window 270 may be used to verify the correct position and alignment of the fold location 210.

Figure 5:
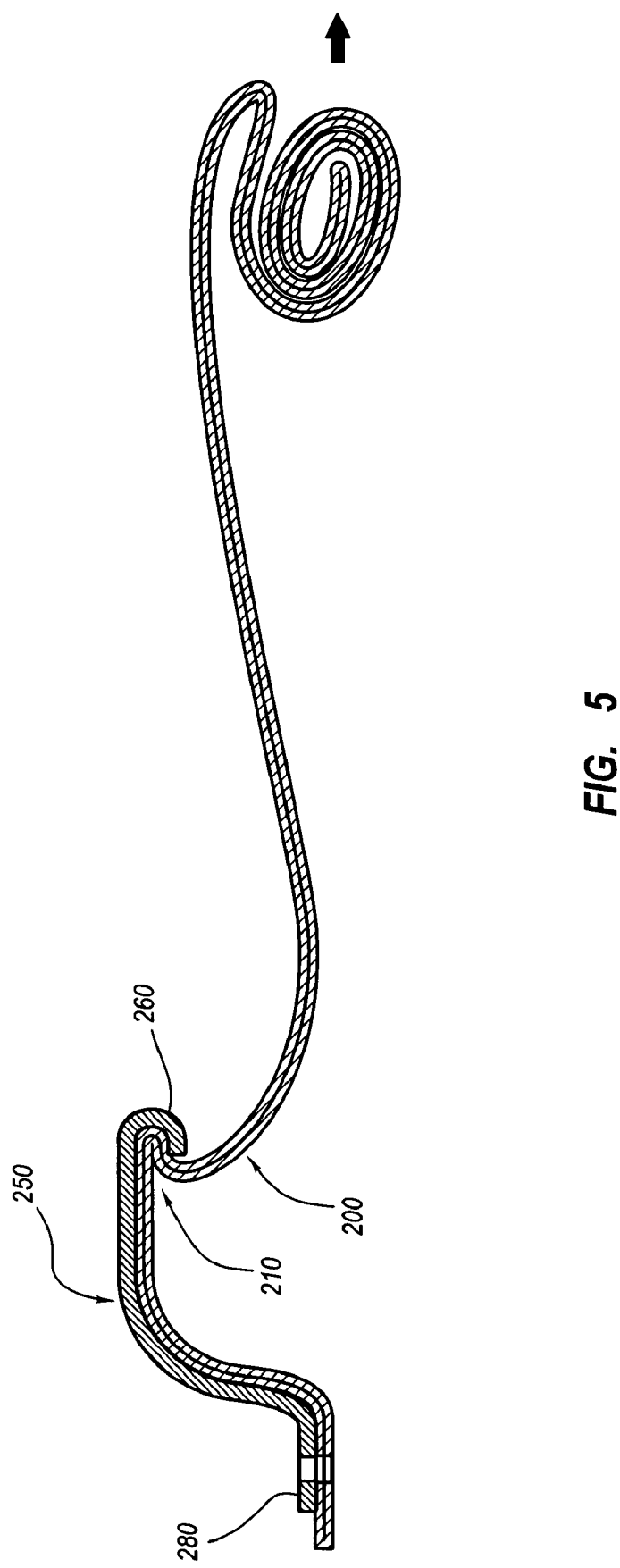
FIG. 5 is a side view of a partially folded airbag cushion with an airbag fold bracket.
Figure 6:
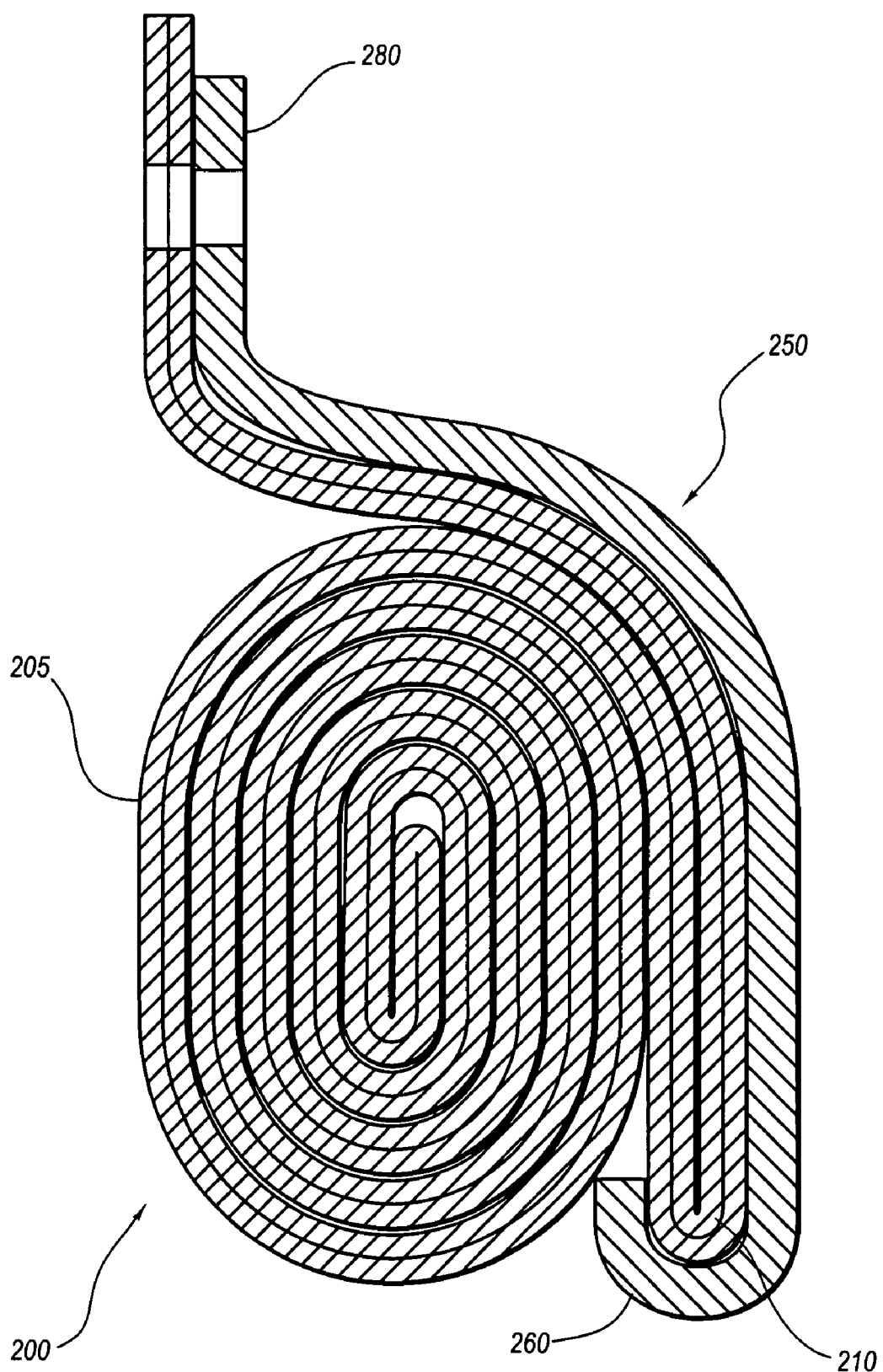
FIG. 6 is a side view of a folded inflatable airbag cushion before inflation with an airbag fold bracket.

Referring to FIG. 5, meant as an example only and not as a limitation, the airbag fold bracket 250 may be used with a vehicle airbag folded with a roll plus one fold technique. The roll plus one technique as used herein includes folding a first edge of an airbag into a position adjacent a first side of the airbag. A second edge of the airbag is rolled toward the first edge of the airbag until the rolled portion is substantially adjacent the fold portion on an opposing side of the airbag. It is also contemplated that the airbag fold bracket 250 may be used with other airbag fold techniques. More particularly, the airbag cushion 200 may be attached by any desired method to the airbag fold bracket 250 at the attachment tab 280. As shown in FIG. 5, the attachment tab 280 may provide a reference point or a rigid pattern indicating where the fold location 210 may be located on the airbag cushion 200. At the fold location 210 at least one fold may be created in the airbag cushion 200 and the shape and position of the fold can be maintained by the airbag fold bracket 250 and the fold retainer clip 260. In addition to the one or more folds of the airbag cushion 200, the airbag cushion 200 may be rolled and prepared for installation in a vehicle. FIG. 6 shows a cross-section view of an airbag cushion 200 folded and rolled with the airbag fold bracket 250 being used to locate and maintain the fold location 210. The airbag cushion 200 may be rolled on the same side or on the opposite side of the direction of the fold at the fold location 210. The airbag cushion 200 may be folded and rolled either before or after the airbag cushion 200 has been attached to the motor vehicle.

With continued reference to FIG. 6, the airbag fold bracket 250 and the position and alignment of the fold location 210 on the airbag cushion 200 can be used to control or tune the deployment of the airbag cushion 200. For example, the folded location 210 may act as a fulcrum upon inflation of the airbag cushion 200, causing the rolled portion 205 of the airbag cushion 200 below the fold location 210 to angle away from the fold location 210. This fulcrum effect causes the airbag cushion 200 to clear interior components of a vehicle, such as a roofrail and a head liner, before fully deploying. The fulcrum effect may also be used to ensure that the airbag cushion 200 deploys along the side of the vehicle and does not deploy into a passenger or other interior components of the vehicle. Once the rolled portion 205 has angled away from the folded location 210, the folded location 210 may relax and unfold out of the fold retainer clip 260 and allow the inflation gasses to more fully inflate the rolled portion 205 which can then roll unobstructed into place and along the proper trajectory to a position between a passenger and the sides of the vehicle. In this way, the airbag fold bracket 250 allows the airbag cushion 200 to deploy along the proper trajectory and into the correct position while reducing the likelihood that the airbag cushion 200 will fold over on itself and interfere with interior car components. The size and shape of the airbag fold bracket 250 may be changed and adjusted to fine tune the deployment of the airbag cushion 200. Specifically, the airbag fold bracket 150 may configure to tune the angle, direction, and timing of deployment.

Figure 7:
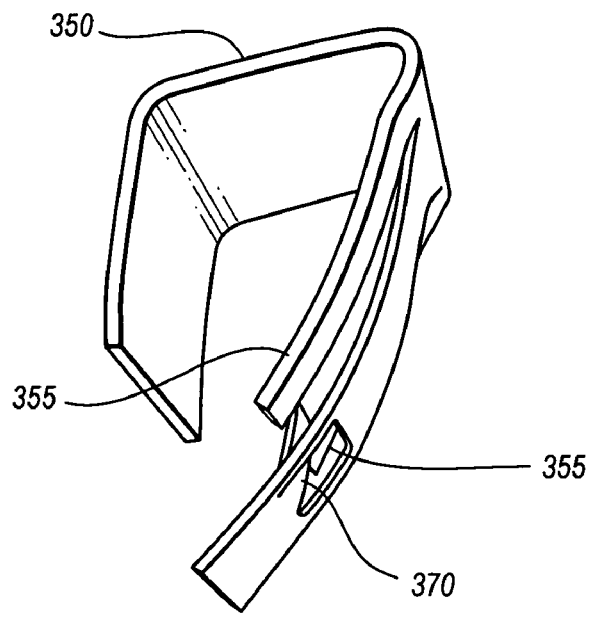
FIG. 7 is a perspective view of an airbag fold bracket.
Figure 8:
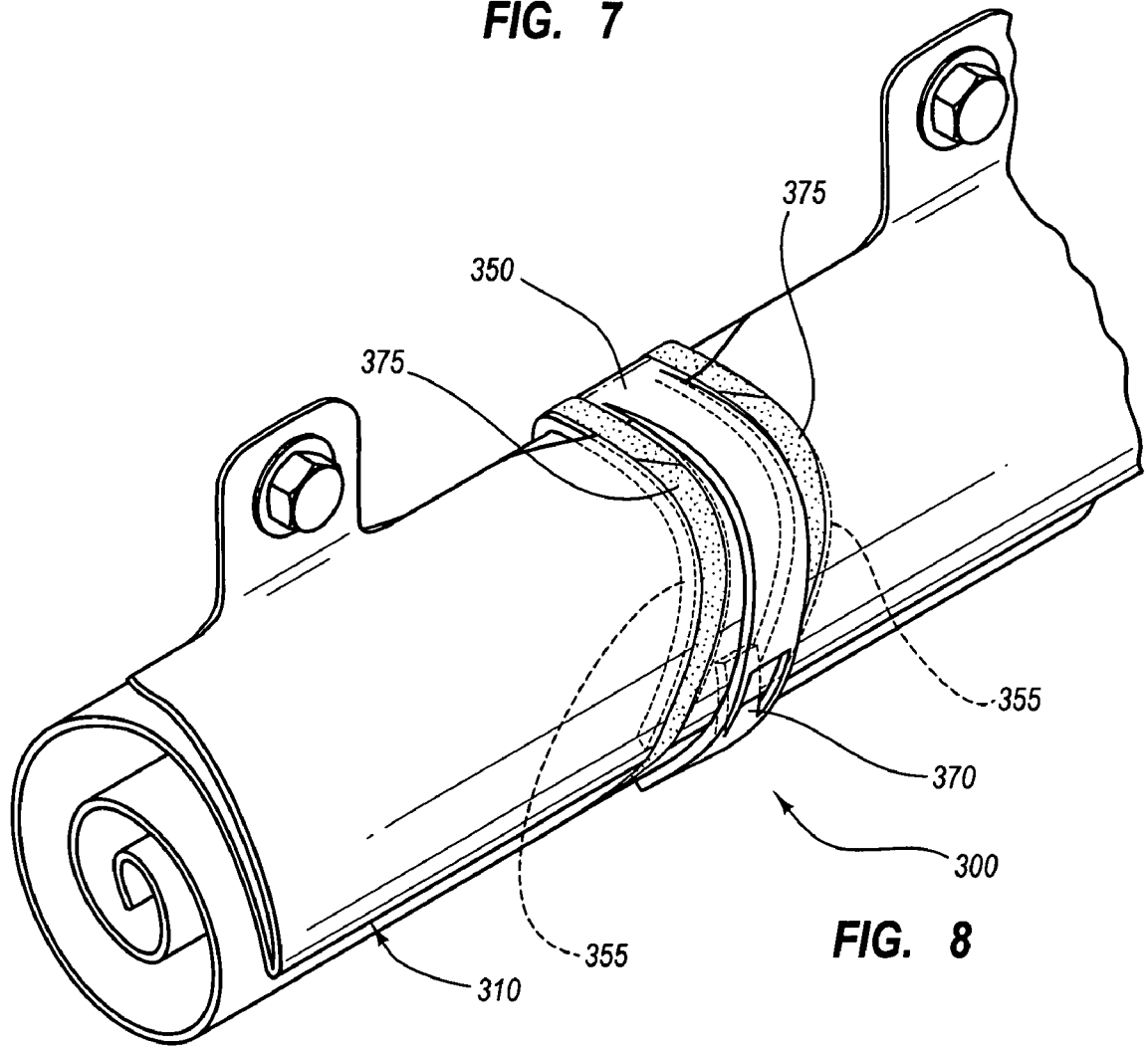
FIG. 8 is a perspective view of a folded inflatable airbag cushion with the airbag fold bracket from FIG. 7 in place.

In yet another embodiment shown by FIG. 7 and FIG. 8, one or more of the airbag fold bracket 350 may be used to locate and maintain fold location 310 for the airbag cushion 300 in the undeployed state. The airbag fold bracket 350 may include a fold retainer tab 370 and one or more positioning tabs 355. The one or more positioning tabs 355 may be configured to tuck behind an edge or fold of the airbag cushion 300 and to maintain the position of the fold location 310. The fold retainer tab 370 may be configured to locate and maintain the fold location 310. For example, the fold retainer tab 370 may be configured as a fixed or rigid measure for alignment of the fold location 310 relative to positioning tabs 355 as they are engaged with a desired location of the inflatable airbag cushion 300. The fold location 310 may be maintained by the fold retainer tab 370 which may be used to verify the correct position and alignment of the fold location 310. The airbag fold bracket 350 may be attached to the airbag cushion 300 at any desired position and in a number of ways such as with rivets, bolts, screws, adhesives, tapes, and other attachment means. For example, as shown by FIG. 8, the airbag fold bracket 350 may be held in place with the use of a break-away tape 375. In another embodiment, the inflatable airbag cushion 300 may be attached to a vehicle roof rail or support or other parts of the vehicle with attachment tabs and secured by the airbag fold bracket 350. As shown in FIG. 8, the airbag fold bracket 350 may be configured to support the inflatable airbag cushion 300 in the undeployed state and configured to locate and maintain the fold location 310 in relation to an edge of the inflatable airbag cushion 300.

Various embodiments of airbag fold positioning and maintenance have been disclosed herein. The airbag fold bracket and/or the fold retainer clip, the fold retainer tab, and the positioning tab are all examples of means for locating, aligning, positioning, or maintaining the shape of an airbag fold. Furthermore, the airbag fold bracket is an example of means for adjusting and tuning the deployment of an airbag cushion.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag system in a motor vehicle comprising:
at least one inflatable airbag in an undeployed state, folded and rolled with a roll plus one fold technique such that there is a rolled portion and a fold; and
at least one airbag fold bracket comprising a first section that is opposite from a second section,
wherein the first section and the second section are oriented to cooperate together to support the rolled portion of the inflatable airbag,
wherein the second section splits into an extension and at least one positioning tab,
wherein the positioning tab is inserted into the fold of the inflatable airbag and has an end adjacent to a fold line of the fold,
wherein the extension comprises an airbag fold retainer tab that is positioned to indicate the location of the fold and to cooperate with the positioning tab to maintain the shape and position of the fold.

2. The airbag system of claim 1, wherein the at least one airbag fold bracket is configured to adjust and tune the deployment of the at least one inflatable airbag.

3. The airbag system of claim 1, wherein the at least one airbag fold bracket is attached to the at least one inflatable airbag.

4. The air airbag system of claim 1, wherein the at least one airbag fold bracket is configured to be attached to a motor vehicle.

5. A method of assembling an inflatable airbag system, the method comprising:
obtaining an inflatable airbag in an undeployed state, folded and rolled with a roll plus one fold technique such that there is a rolled portion and a fold;
obtaining an airbag fold bracket comprising a section that splits into an extension and at least one positioning tab;
positioning the airbag fold bracket at a desired position of the inflatable airbag by inserting the positioning tab into the fold of the inflatable airbag such that an end of the positioning tab is adjacent to a fold line of the fold;
positioning the rolled portion within the bracket such that the rolled portion is supported; and
engaging the positioning tab with an airbag fold retainer tab that extends from the extension to maintain the position and shape of the airbag fold and that is positioned to indicate the location of the fold.

6. The method of claim 5, wherein positioning an airbag fold bracket at a desired position of the inflatable airbag comprises attaching the airbag fold bracket to the desired position of the inflatable airbag.

7. The method of claim 6, wherein attaching the airbag fold bracket comprises attaching the airbag fold bracket to the inflatable airbag with tape, at least one clip, at least one staple, at least one bolt, at least one screw, adhesive or combinations thereof.

8. An inflatable airbag fold bracket for use in a system in a motor vehicle with an inflatable airbag in an undeployed state, folded and rolled with a roll plus one fold technique such that there is a rolled portion and a fold, the bracket comprising:
a first section that is opposite from a second section,
wherein the first section and the second section are oriented to cooperate together to support a rolled portion of an inflatable airbag,
wherein the second section splits into an extension between two positioning tabs,
wherein the extension is longer than the two positioning tabs and each positioning tab has a length that permits each positioning tab to be inserted into a fold of the inflatable airbag such that each positioning tab has an end adjacent to a fold line of the fold, and
wherein the extension comprises an airbag fold retainer tab positioned to indicate the location of the fold and to cooperate with the positioning tabs to maintain the shape and position of the fold.

9. The inflatable airbag fold bracket of claim 8, wherein the extension and the positioning tabs are configured to adjust and tune the deployment of an airbag cushion in a motor vehicle.

* * * * *